United States Patent [19]
Overbury

[11] 3,885,241

[45] May 20, 1975

[54] DOPPLER RADIO NAVIGATION BEACON SYSTEM ADAPTED FOR ANGLE DETERMINATION USING UNMODIFIED COMMUNICATION RECEIVER

[75] Inventor: Francis Giles Overbury, Cuffley, England

[73] Assignee: International Standard Electric Corporation, New York, N.Y.

[22] Filed: Nov. 14, 1973

[21] Appl. No.: 415,809

[30] Foreign Application Priority Data
Nov. 16, 1972 United Kingdom............ 528861/72

[52] U.S. Cl.......... 343/106 D; 343/102; 343/108 M
[51] Int. Cl............................................. G01s 1/38
[58] Field of Search.......... 343/106 D, 107, 108 M, 343/102

[56] References Cited
UNITED STATES PATENTS
3,728,729   4/1973   Overbury...................... 343/106 D

*Primary Examiner*—Maynard R. Wilbur
*Assistant Examiner*—Richard E. Berger
*Attorney, Agent, or Firm*—William T. O'Neil

[57] ABSTRACT

A radio navigation beacon system including a commutated main beacon array and a reference array. The commutation of the main array produces a simulated Doppler signal at a remote receiving point. The Doppler frequency is a function of the remote station angle from a reference line related to the main array. The received signals at the remote station are capable of audible interpretation, based on establishment of a convenient audible tone. To provide this tone, a carrier of frequency $f$, and a single sideband $f$, + (or −) $\delta f$ removed by an audio frequency (e.g., 400 Hz) are radiated from the reference antenna. A beat on the order of 2 Hz is established by radiating from the commutated main array, a single sideband of $f$ + (or −) $\delta f$ + (or −) $\Delta f$ ($\Delta f$ being on the order of 2 Hz). The number of audible beats may be counted (within a predetermined period) thereby to convey angle information to the remote station via an unmodified communication receiver.

9 Claims, 1 Drawing Figure

DOPPLER RADIO NAVIGATION BEACON SYSTEM ADAPTED FOR ANGLE DETERMINATION USING UNMODIFIED COMMUNICATION RECEIVER

CROSS REFERENCE TO RELATED CASES

This application is filed with claim for priority, as provided under 35 USC 119, based on an application for a patent on the same invention in Great Britain, on Nov. 16, 1972, serial number 52886/72.

BACKGROUND OF THE INVENTION

1. Field of the Invention

This invention relates generally to air navigation aids and more particularly to radio navigation beacons of the simulated Doppler type, for example, such as Classified in U.S. patent class 343, sub-class 106, 108, 112 and 113.

2. Description of the Prior Art

In the prior art, it is known to commutate the elements of the linear array at a ground location, so that only one element is energized at any one time. Both azimuth (bearing) and elevation angles for aircraft landing approach have been measured by equipment commonly referred to as a Doppler radio navigation beacon system. The commutated arrays are oriented horizontally for bearing determinations and vertically for glide slope (elevation) angle determination. In both cases, the angle information is air-derived by single processing of the simulated Doppler frequency (produced by the apparent radiation source motion during the said array commutation) against a steady reference signal.

In the known systems for this purpose, the receiver at the remote (airborne) station is a specially designed device capable of accurate angle determination by relating the received Doppler signal to a physical angle according to a known relationship. For an understanding of the related prior art, the reader is referred to U.S. Pat. No. 3,626,419 entitled "Doppler Navigation System," U.S. Pat. No. 3,728,729 entitled "Radio Navigation Beacon"; U.S. Pat. No. 3,757,222, entitled "Single Sideband Generator Employing a Plurality of Cyclically Switched Shorting Diodes Controlling a Transmission Line Electrical Length"; and British Pat. No. 1,187,760.

In any instrumentation for air derivation of angular data, the problem of guidance of unequipped aircraft presents itself. The manner in which the present invention makes operation with an unmodified communication receiver possible, and affords other operational advantages will be understood as this description proceeds.

SUMMARY

According to the invention, there is provided a radio navigation beacon including first means for radiating radio-frequency energy of a first frequency and a second frequency differing from said first frequency by $\delta f$, where $\delta f$ is an audio frequency; and second means for simulating constant velocity linear scanning motion of a radiating source of radio-frequency energy of a third frequency differing from said second frequency by $\Delta f$, where $\Delta f$ is a sub-audio frequency.

The beacon as stated in the above paragraph has applications where bearing measurement to moderate accuracies would be useful to the user of a communication receiver at a remote station, such as an aircraft on landing approach, without the addition of any attachment or modification.

Information extraction is effected by counting a number of audible beats within a period clearly marked by the beacon. Such a period may be for example, 1 minute, a time within which beat counts between 10 and 230 can be accurately made. In this way a predetermined angular sector would be divided into 220 radials.

After each period of transmission of ear detected information there may be a short (e.g. 5 second) burst of higher precision Doppler generated tone capable of resolution by a simple counter attached to the audio output of the receiver either by microphone or electrical connection. That refinement makes it possible to resolve the same sector to a granularity of 1:5000.

The invention will be better understood from the description hereinafter in conjunction with the accompanying drawings.

DESCRIPTION OF THE PREFERRED EMBODIMENT

Figure 1:
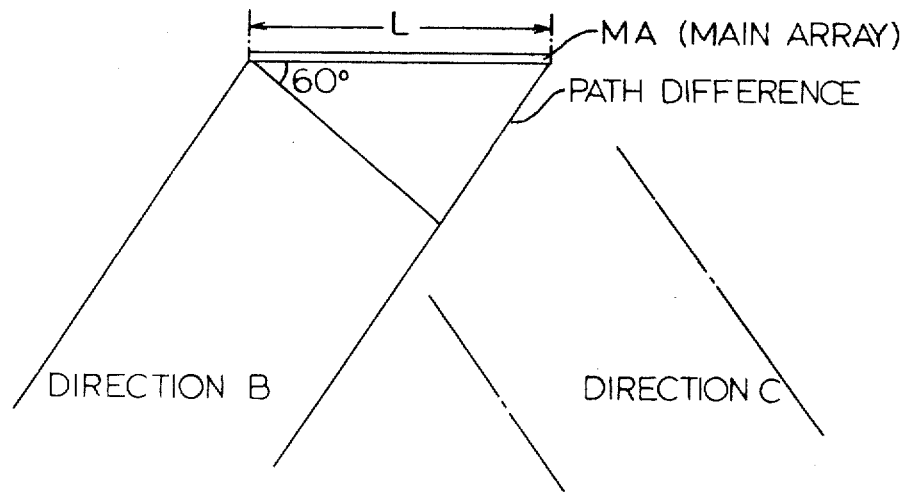
FIG. 1 is a schematic representation of a main array of the beacon and a typical useful bearing sector angle.
Figure 2:
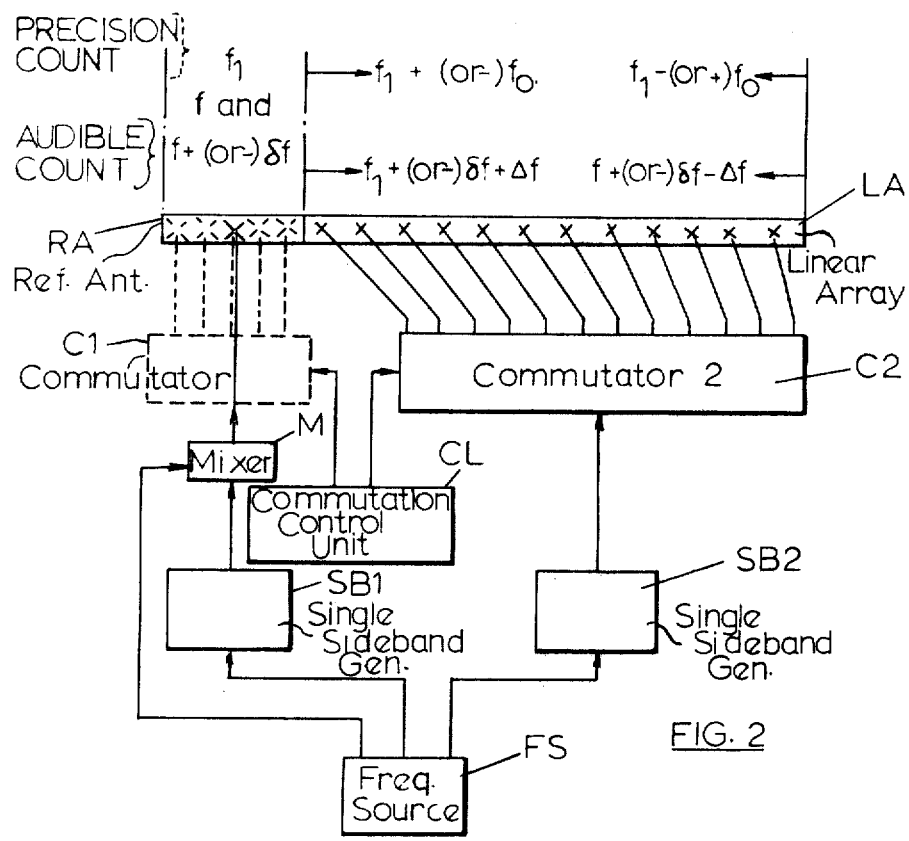
FIG. 2 is a block schematic diagram of the beacon whereon its alternative according to the invention (precision count and audible count) modes of operation are indicated.

At the outset the FIGS. 1 and 2 are referred by by symbols as appropriate.

The method of audible interpretation employed in the present invention is based on establishing a convenient audible tone by and through radiation from a reference antenna RA (which may actually be an array of reference antennas via a commutator C1) of a carrier frequency $f_1$ from a frequency source FS and a single sideband $f_1 + (\text{or} -) \delta f$ from a single sideband generator SB1, removed from the carrier frequency by an audio frequency (e.g. $\delta f = 400$ Hz). Those signal components are mixed in mixer M prior to commutator C1.

A suitable single sideband generator is described in U.S. Pat. No. 3,757,222, which discloses a digital single-sideband generator in which the carrier frequency is fed via a circulator to a (microstrip) transmission line having a series of switchable short circuits (RF grounded diodes) along a length of the line equal to half the carrier wavelength. Successive cyclic switching of the diodes simulates a moving RF energy reflector advancing or retarding the phase of the reflected energy reflector advancing or retarding the phase of the reflected energy according to direction of switching and resulting in a frequency offset at the circulator output determined by the cyclic rate.

A low frequency amplitude beat of around 2Hz (120 counts per minute) is established by radiating from a main linear array LA a second single sideband of $f_1 + (\text{or} -) \delta f + (\text{or} -) \Delta f$ ($\Delta f$ being a sub-audio frequency of 2Hz) from a single sideband generator SB2 via a commutator C2. The linear array LA consists of a number of antennas as used in the Doppler guidance system described in the aforementioned U.S. Pat. No. 3,626,419, and U.S. Pat. No. 3,670,337. In U.S. Pat. No. 3,626,419, the antenna array consists of equally spaced elements excited by successive scans each in the same direction along the array, i.e., unidirectional scans. In U.S. Pat. No. 3,670,337, the antenna array consists of equally spaced elements excited by successive scans in first direction and then in the opposite direction along the array, i.e., bidirectional scans.

Simulated constant velocity movement of this second source along the array LA through commutation applied by commutator C2 with a total scan period equal to the counting period (1 minute) will generate a Doppler shift of the frequency of this source as a function of the sine of the angle subtended by the observer at the array. In this way the audible amplitude beat will change and can be designed to generate a range of beat frequencies between the above mentioned limits of 10 to 230 counts per minute (for example) as a function of direction.

The direction referred to is the bearing angle, since the invention is being described typically with respect to bearing determination. It will be understood, however, that the same principles could be applied to the elevation case if desired.

To change the low frequency beat component by one cycle it is necessary to generate one full wavelength of path difference between the reference RA and the main array LA.

During a counting period of one minute with an available count range between 10 and 230, a useful sector angle over which good accuracy may be achieved from a single linear array is ±60°, as depicted in FIG. 1. With these parameters, commutation must generate a change of path length between reference and second source which differs by 220 wavelengths as viewed along direction B as compared with the path difference generated by commutation when viewed from direction C.

If the path difference is to be generated as the result of a single scan, a baseline L, of 126 wavelengths is required, according to the equation $$L = \frac{110 \text{ wavelengths}}{\sin 60°} = \text{approx. 126 wavelengths.}$$

See FIG. 1, where $L$ is shown as the main array length. The 60° sector includes the total angle between directions B and C, which is ±30° with respect to the array normal. The array normal might be aligned with the runway centerline for aircraft landing purposes.

As is well known, the change of scan direction involved at the end of each individual scan will inevitably generate a phase transient in the information envelope. In all cases, except when reversal occurs at the peak of the beat envelope, a cusp occurs. The depth of this cusp is a function of the exact beat envelope phase existing at the instant of reversal.

Any cusp which exists in the audible beat envelope during the count period may produce spectral splatter and should therefore be excluded.

Most simple, therefore, in the system of the present invention the audible information is generated by a single unidirectional scan involving a baseline of 120 or more wavelengths. At 150 MHz, i.e., for reception by a V.H.F. communication receiver, this is 240 meters, which is somewhat long, however, is desirable for good multipath rejection especially for the instrument (precision count) mode.

Nevertheless, halving of baseline is possible if the cusp is avoided at one end of the scan by special phasing, in which case a bidirectional scan over a 60 wavelength baseline will produce the required count range.

The avoidance of the aforementioned cusp may be achieved only at one end of a bidirectional scan, by siting the reference antenna RA very close to (or making it the same element) as the end element of the main array LA at which the bidirectional scan is reversed, i.e., half completed. Suitable R.F. phasing is then arranged such that the two components of the audible beat $\delta f$ and $\delta f \pm \Delta f$) are accurately in phase (or 180° out of phase) at the time corresponding to this end of the scan period. As the two elements are co-sited, this unique phase condition will exist in all directions.

The above cusp avoidance technique, though providing an information continuity consistent with 120 wavelengths baseline, does not provide corresponding site error improvement. Nevertheless, 60 wavelengths of baseline under moderate multipath situations will give quite adequate accuracy (±0.05°), consistent even with the higher precision technique (precision count mode).

In general, where an information filter of limited bandwidth is to be used it is sufficient to "mark out" an information envelope with sequential antenna contributions as much as 120° different in phase from each other. The audible beat technique depending on the generation of good maxima and (especially) minima, requires the provision of closer spacing of antenna elements. If the adjacent radiator elements of the commutated array are as close as ⅓ wavelength, this would require 360 elements for a baseline of 120 wavelengths, with a single reference antenna.

In order to minimize the number of elements of the main array, a commutated reference array may be used, as described in the aforementioned U.S. Pat. No. 3,728,729.

Based on the technique described in this specification, there are a number of reference radiators to which the mixed frequencies $f_1$ and $f_1 +$ (or $-$) $\delta f$ are commutated in sequence in association with the signal ($f_1 +$ (or $-$) $\delta f +$ (or $-$) $\Delta f$) commutated to the main array. Using 12 reference radiators in RA, spaced at ⅓ wavelengths (reducing the total number of elements from 361 to 42), the reference frequencies are commutated through a complete cycle, i.e., to each reference radiator in turn during the time period that each main array element is radiating. Commutation sense to the two arrays RA and LA is in opposite directions.

The above-described array of 60 or 120 wavelengths, is capable of bearing data generation at an accuracy higher than is consistent with the limited granularity of the audible beat count method. The audible beat count divides a sector of 120° to a precision of about 220 (about ½°).

Yet 60 and 120 wavelength Doppler systems are capable of accuracy generation in the region of a few hundreths of a degree depending on specific multipath conditions. The full potential of the array can be made available to a user who is prepared to make a small external addition to his receiver. This addition takes the form of a counter either wired in parallel with the audio output terminals of the communication receiver or even coupled to its speaker by microphone.

In this high precision mode, normal Doppler guidance system practice is followed, i.e., as described in U.S. Pat. No. 3,626,419 and U.S. Pat. No. 3,670,337. That arrangement includes radiation from the reference antenna(s) of a single frequency component $f_1$, and from the main commutated array $f_1 +$ (or $-$)$f_o$ is radiated with unidirectional scanning thereof. Also, bidirectional scanning, with $f_1 +$ (or $-$)$f_o$ and $f_1 -$(or $+$)$f_o$ alternately radiated (one of these frequencies for each direction of scan), where $f_o$ is for example 2KHz. If a working range of 1.5 to 2.5 KHz is adopted, to keep within the audio limitations of the receiver, a sector resolution of 5,000 is obtainable over 5 seconds. (1,000Hz frequency change possible — 5 seconds counting).

In neither of the manual (audible count) or automatic (high precision) counting modes is a time reference required. In each case the beginning and end of each period is automatically marked by the beacon either by special tone burst or by the onset of each distinctive tone itself. Bearing measurement involves counting the total number of cycles of Doppler generated by the commutation sequence within that period. In the precision mode, multiple scanning and digitization is applied.

The generation of 5,000 cycles of Doppler change within a 5 second period for a $\pm 60°$ bearing change implies a total scan distance of $$\frac{2500}{\sin 60°} = \text{approx. 2870 wavelengths.}$$

With a basic array length of 60λ this requires about 46 single scans or 23 double scans with digitization within the 5 second period.

For this high precision mode, SB1 is non-operative, or its output not used, and SB2 is arranged to deliver the requisite offset frequency of $f_1 +$ (or $-$) $f_o$. The commutator C2 (and C1 with reference array scanning) are appropriately controlled at the necessary higher scan rate by commutation control CL, a programmer readily constructed from knowledge of its function and the commutation units C1 and C2.

It is desirable to have the equipment operable in both modes, in order to permit both audible and high precision counts to be carried out. In that arrangement, beacon operation involves a total repetitive sequence lasting 65 secs., as follows:

a. one bidirectional scan along a 60 wavelength main array with cusp avoidance end element phasing as hereinbefore described (60 secs.).
b. 23 bidirectional scans along the array with digitization (5 secs.).

Sequence "a" involves the radiation of $f_1$ and an offset component $f_1 +$ (or $-$) 400Hz from the reference antenna(s) and a component ±2Hz removed from the offset radiation transmitted from the main array.

Sequence "b" involves transmission of $f_1$ from the reference antenna(s) and $f_1$ ±2KHz from the main array.

The system is usable on a variety of radio frequencies. At 5GHz, 60λ corresponds to 12 ft., at 100 MHz to 600 ft.

For reception of a VHF/FM receiver, the offset frequency $\delta f$ is preferably increased to 2KHz for the manual (audible count) counting mode.

It is to be understood that the foregoing description of specific examples of this invention is made by way of example only and is not to be considered as a limitation on its scope.

What is claimed is:

1. A Doppler radio navigation beacon for radiation of signals adapted to be processed by a remote station for angle determination, comprising:
    first means for radiating radio-frequency energy including a first frequency component and a second frequency component differing from said first component by an audio frequency $\delta f$
    and second means for radiating energy at a third frequency differing from said second frequency by a sub-audio frequency $\Delta f$, said second means including a multi-element linear array and third means for commutating said array such that each element thereof radiates discretely and successively according to a predetermined order.

2. Apparatus according to claim 1 in which said linear array elements are uniformly spaced and said commutation is unidirectional.

3. Apparatus according to claim 1 in which said linear array elements are uniformly spaced and said commutation is bidirectional along said array, including a frequency source for producing said first and third frequencies, and including a first single sideband generator responsive to said first frequency to add said second frequency thereto.

4. A radio navigation beacon comprising:
    first means for radiating radio-frequency energy of a first frequency and a second frequency differing from said first frequency by $\delta f$ where $\delta f$ is an audio frequency;
    and second means for simulating constant velocity linear scanning motion of a radiating source of radio-frequency energy of a third frequency differing from said second frequency by $\Delta f$, where $\Delta f$ is a sub-audio frequency.

5. A beacon as defined in claim 4 in which said first means comprises a single radiating element, and said second means comprises a linear array of equally spaced radiator and means for commutating said third frequency unidirectionally along said array.

6. A beacon as defined in claim 4 in which said first means comprises a single radiating element and said second means comprises a linear array of equally spaced radiators, means for commutating said third frequency bidirectionally along said array and means for changing the sign of $\Delta f$ at each half period of commutation of the array.

7. A beacon as defined in claim 4 in which said first means comprises a first linear array of equally spaced aerials and means for commutating said first and second frequencies unidirectionally along said array, and in which said second means comprises a second linear array of equally spaced radiators spaced from one another by a distance equal to the overall length of the first array and means for commutating said third frequency unidirectionally along said second array, the first and second frequencies being commutated along said first array during energisation of each of said second array aerials by said third frequency and commutation of the two arrays being in opposite directions.

8. A beacon as defined in claim 4 in which said first means comprises a first linear array of equally spaced aerials, means for commutating said first and second frequencies bidirectionally along said first array, and means for changing the sign of $\delta f$ at each half period of commutation of said first array, and in which said second means comprises a second linear array of equally spaced elements spaced from one another by a distance equal to the overall length of said first array, means for commutating said third frequency bidirectionally along said second array, and means for changing the sign of $\Delta f$ at each half period of commutation of the second array, the first and second frequencies being commutated bidirectionally along said first array during energisation of each of said second array aerials by said third frequency and commutation to the two arrays being in opposite directions.

9. A beacon as claimed in claim 7 in which the nearest adjacent element of the first array is spaced by a small distance down to zero, as compared to the end element of the array, and in which the second frequency and the third frequency have relative phases selected from 0° and 180° possibilities at a time corresponding to an end of the commutation period.

* * * * *